Aug. 13, 1957  H. BRÜNE  2,802,309
METHOD OF PRODUCING MULTILAYERED
BLOWN HOLLOW GLASS BODIES
Filed June 12, 1951
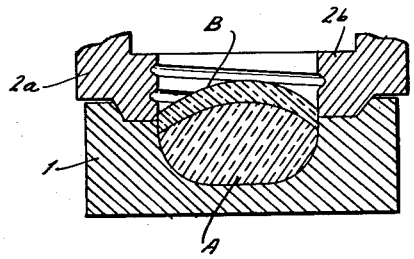
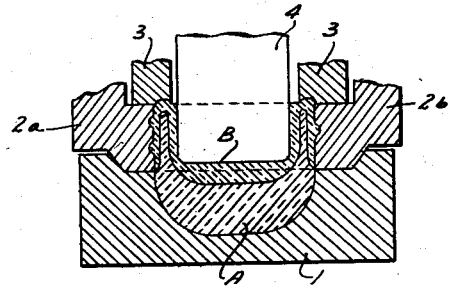
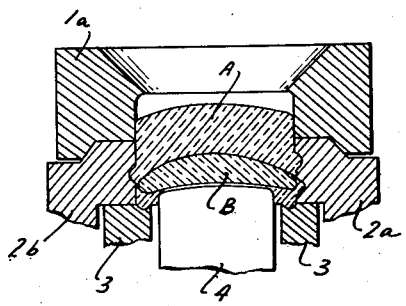
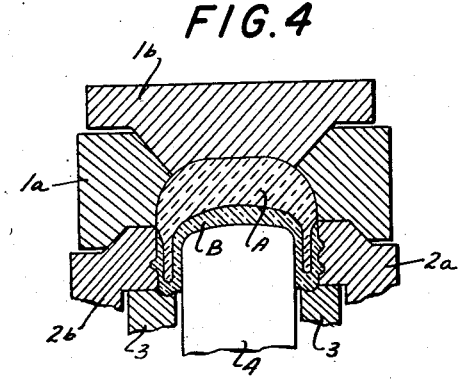
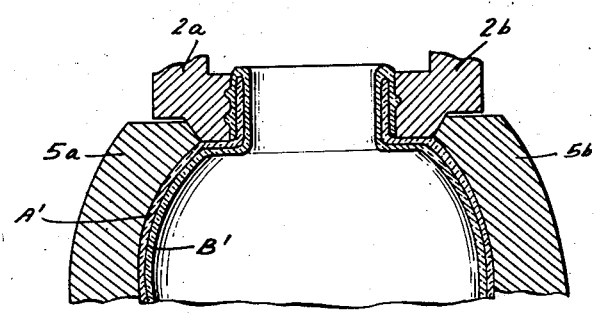
INVENTOR.
Herbert Brüne
BY Michael S. Striker
agt.

United States Patent Office 2,802,309
Patented Aug. 13, 1957

2,802,309

METHOD OF PRODUCING MULTILAYERED BLOWN HOLLOW GLASS BODIES

Herbert Brüne, Porz, Germany

Application June 12, 1951, Serial No. 231,132

Claims priority, application Germany October 28, 1949

3 Claims. (Cl. 49—80)

This invention relates to a method of producing multilayered hollow glassware.

Multilayered blown hollow glass bodies, as two-layered lamps of known type or the like, have been blown hitherto by mouth. This method is cumbersome and takes much time with the result that the articles made are relatively expensive.

The method of producing such bodies according to the present invention comprises the steps of successively placing different batches of glass in superimposed layers in a parison mold to form a charge, depressing the central portion of said charge by a plunger to form a dished parison consisting of superimposed layers of said different layers of glass, one layer for each batch, and blowing up said parison to the desired shape of the article. In this way, multilayered blown hollow glassware can be semi-automatically produced, so that manufacture is accelerated and simplified and the price of the articles reduced.

The device used for carrying out the new method comprises a parison mold of known construction for receiving the various batches of glass forming the different layers, a plunger entering the parison mold and jointly subjecting the superimposed layers to preliminary pressure, means for removing the dished parison so obtained from the parison mold and for partly blowing up the initially blown glass body and a finishing mold for the reception of the initially blown multilayered glass body. Additional means serve for finish blowing of the body in the finishing mold.

The invention can be embodied in many different ways. One embodiment thereof is illustrated in the accompanying drawing, in which—

Figure 1 is a section of a filled parison mold;

Fig. 2, a section of the same mold after introduction of a plunger;

Figs. 3 and 4 show another form of a parison mold; and

Fig. 5 is a section of a finishing mold.

A parison mold according to Figs. 1 and 2 comprises a bottom part 1 on which two jaws 2a, 2b are placed. Into the hollow space of the mold different batches of glass A and B are introduced successively which later on form the layers, in this instance two, of the hollow glass body. After the parison mold has been filled a sealing ring 3 is put on top of the two jaws 2a, 2b and a plunger 4 is introduced into the mold. The two batches of glass A and B are then preliminarily depressed, as shown in Fig. 2, whereupon the plunger 4 is lifted off from the sealing ring 3 and the dished parison removed from the mold by means of the two-part jaws 2a, 2b. While hanging between these jaws the parison is subjected to preliminary blowing by means of a tool not shown. Finally, members 5a, 5b (Fig. 5) constituting the finishing mold are attached to jaws 2a, 2b holding the glass body. Immediately afterwards finish blowing of the body occurs, so that the batches of glass contact the inner surface of the finishing mold 5a, 5b and form a hollow glass body constituting of the two superposed layers A' and B'.

Instead of being made of two different batches of glass as shown, a hollow glass body may of course also be produced from more than two layers without altering the process.

In the same manner production may take place in the parison mold shown in Figs. 3 and 4. This mold comprises a part 1a and a covering plate 1b. The jaws 2a, 2b as well as the sealing ring 3 are here arranged on the underside of the mold. The plunger 4 enters the primary mold from below, and the batches of glass A and B are inserted from above. After filling of the mold the covering plate 1b is put on, and preliminary pressing takes place in the now closed primary mold.

Subsequent operations are the same as previously described. The removal of the parison mold and plunger 4 is followed by preliminary blowing and, finally, by finish blowing in the mold 5a, 5b. The equipment shown in Figs. 3 and 4 is like the first one capable of producing hollow glass bodies formed of more than two layers.

I claim:

1. The method of producing multilayered hollow glassware comprising, in combination, the steps of successively placing a plurality of different batches of glass in superimposed layers in a primary mold to form a charge; depressing the central portion of said charge by a plunger to form a dished parison consisting of superimposed layers of said different batches of glass, one layer for each batch; and blowing up said parison to the desired shape of the article.

2. The method of producing multilayered hollow glassware comprising, in combination, the steps of successively placing at least two different batches of glass in superimposed layers in a primary mold to form a charge; depressing the central portion of said charge by a plunger to form a dished parison consisting of superimposed layers of said different batches of glass, one layer for each batch; blowing up said parison to form a hollow glass body; introducing the thus formed glass body into a finishing mold; and blowing up said glass body in said finishing mold to the desired shape of the article.

3. The method of producing multilayered hollow glassware, comprising, in combination, the steps of arranging at least two different batches of glass in superimposed layers within a first mold to form a charge, one of said layers being thicker, and the other of said layers being thinner; depressing the central portion of said charge on the side of said thinner layer by a plunger to form a dished parison consisting of superimposed layers of said different batches of glass, one layer for each batch; and blowing up said parison to form a hollow glass body; introducing the thus formed glass body into a finishing mold; and blowing up said glass body in said finishing mold to the desired shape of the article.

References Cited in the file of this patent

UNITED STATES PATENTS

| | | |
|---|---|---|
| 1,002,956 | Arbogast | Sept. 11, 1911 |
| 1,266,785 | Finkbeiner | May 21, 1918 |
| 1,680,544 | Ingle | Aug. 14, 1928 |
| 1,770,335 | Fuwa | July 8, 1930 |
| 2,500,105 | Weber | Mar. 7, 1950 |
| 2,512,781 | Stewart | June 27, 1950 |

FOREIGN PATENTS

| | | |
|---|---|---|
| 881,991 | Germany | May 21, 1953 |
| 293,606 | Italy | Feb. 26, 1932 |